(12) United States Patent
Zhang et al.

(10) Patent No.: US 11,943,793 B2
(45) Date of Patent: Mar. 26, 2024

(54) AI ENGINE-SUPPORTING DOWNLINK RADIO RESOURCE SCHEDULING METHOD AND APPARATUS

(71) Applicant: University of Science and Technology Beijing, Beijing (CN)

(72) Inventors: Haijun Zhang, Beijing (CN); Wanqing Guan, Beijing (CN); Dong Wang, Beijing (CN); Tongwei Lu, Beijing (CN); Xiangming Wen, Beijing (CN); Keping Long, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 209 days.

(21) Appl. No.: 17/537,542

(22) Filed: Nov. 30, 2021

(65) Prior Publication Data
US 2022/0417956 A1    Dec. 29, 2022

(30) Foreign Application Priority Data
Jun. 29, 2021    (CN) .......................... 202110729669.4

(51) Int. Cl.
*H04W 72/50*    (2023.01)
*G06N 20/00*    (2019.01)
*H04L 47/62*    (2022.01)
*H04W 72/23*    (2023.01)

(52) U.S. Cl.
CPC .......... *H04W 72/535* (2023.01); *G06N 20/00* (2019.01); *H04L 47/6225* (2013.01); *H04W 72/23* (2023.01)

(58) Field of Classification Search
CPC .. H04W 72/535; H04W 72/23; H04L 47/6225
See application file for complete search history.

(56) References Cited

U.S. PATENT DOCUMENTS

| 2021/0208932 A1* | 7/2021 | Park | G06F 9/5027 |
| 2022/0232396 A1* | 7/2022 | Cavcic | H04W 16/18 |

* cited by examiner

*Primary Examiner* — Samina F Choudhry
(74) *Attorney, Agent, or Firm* — True Shepherd LLC; Andrew C. Cheng

(57) ABSTRACT

An Artificial Intelligence (AI) engine-supporting downlink radio resource scheduling method and apparatus are provided. The AI engine-supporting downlink radio resource scheduling method includes: constructing an AI engine, establishing a Socket connection between an AI engine and an Open Air Interface (OAI) system, and configuring the AI engine into an OAI running environment to utilize the AI engine to replace a Round-Robin scheduling algorithm and a fair Round-Robin scheduling algorithm adopted by a Long Term Evolution (LTE) at a Media Access Control (MAC) layer in the OAI system for resource scheduling to take over a downlink radio resource scheduling process; sending scheduling information to the AI engine through Socket during the downlink radio resource scheduling process of the OAI system; and utilizing the AI engine to carry out resource allocation according to the scheduling information, and returning a resource allocation result to the OAI system.

10 Claims, 3 Drawing Sheets

---

Construct an AI engine, establish a Socket connection between an AI engine and an OAI system, and configure the AI engine into an OAI running environment, so as to utilize the AI engine to replace a Round-Robin scheduling algorithm and a fair Round-Robin scheduling algorithm adopted by LTE at the MAC layer in the OAI system for resource scheduling to take over a downlink radio resource scheduling process.  ⟶ S1

Send scheduling information to the AI engine through Socket during the process of the OAI scheduling resources.  ⟶ S2

Utilize the AI engine to carry out resource allocation according to the scheduling information, and return an allocation result to the OAI.  ⟶ S3

AI ENGINE-SUPPORTING DOWNLINK RADIO RESOURCE SCHEDULING METHOD AND APPARATUS

CROSS REFERENCE TO THE RELATED APPLICATIONS

This application is based upon and claims priority to Chinese Patent Application No. 202110729669.4, filed on Jun. 29, 2021, the entire contents of which are incorporated herein by reference.

TECHNICAL FIELD

The present invention relates to the field of wireless communication technology, and in particular, to an AI engine-supporting downlink radio resource scheduling method and apparatus.

BACKGROUND

In the field of wireless transmission, downlink resources are transmitted from a base station to clients. A conventional LTE system will produce a great deal of redundant information and a lot of processing delays during the process of interactive transmission of downlink control resources. During the information transmission in LTE system, only after information is confirmed and transmitted multiple times and through layer-by-layer feedbacks of the system can transmission be ultimately performed. During this process, long delays will be produced, and a lot of resources will be wasted.

SUMMARY

The present invention provides an AI engine-supporting downlink radio resource scheduling method and apparatus in order to solve the technical problem that the prior art will produce long delays and waste a lot of resources during resource scheduling.

In order to solve the aforementioned technical problem, the present invention provides the following technical solution:

In one aspect, the present invention provides an AI engine-supporting downlink radio resource scheduling method, including:

constructing an AI engine, establishing a Socket connection between the AI engine and an OAI system, and configuring the AI engine into an OAI running environment, so as to utilize the AI engine to replace the Round-Robin scheduling algorithm and the fair Round-Robin scheduling algorithm adopted by LTE at an MAC layer in the OAI system for resource scheduling to take over a downlink radio resource scheduling process;

sending scheduling information to the AI engine through Socket during the resource scheduling process in an OAI system; and utilizing the AI engine to carry out resource allocation according to the scheduling information, and returning a resource allocation result to the OAI system.

Further, the AI engine adopts a preset deep reinforcement learning algorithm to carry out the scheduling of the downlink radio resources.

Further, the deep reinforcement learning algorithm is a DDQN algorithm.

Further, the utilizing the AI engine to carry out resource allocation according to the scheduling information includes:

utilizing the preset deep reinforcement learning algorithm to carry out the scheduling of the radio resources by regarding the ever-changing demand on user service as a state of the environment and the allocated radio resources as the environment; and learning a value distribution of action by minimizing the difference between an estimated value distribution of action and a target value distribution of action, and learning a value distribution of action through an estimated value distribution of state and an action advantage function.

Further, after the utilizing the AI engine to carry out resource allocation according to the scheduling information, the method also includes:

monitoring the sequence number of scheduled frames, downlink bandwidth and maximum downlink information quantity in real time, and displaying a monitoring result.

In another aspect, the present invention provides an AI engine-supporting downlink radio resource scheduling apparatus, including:

an AI engine construction module, configured for constructing an AI engine, establishing a Socket connection between the AI engine and an OAI system and configuring the AI engine into an OAI running environment, so as to utilize the AI engine to replace the Round-Robin scheduling algorithm and the fair Round-Robin scheduling algorithm adopted by LTE at the MAC layer in the OAI system for resource scheduling to take over a downlink radio resource scheduling process;

a scheduling information sending module, configured for sending scheduling information to the AI engine through Socket during the resource scheduling process of an OAI system; and a resource allocation and allocation result sending module, configured for utilizing the AI engine to carry out resource allocation according to the scheduling information and returning a resource allocation result to the OAI.

Further, the AI engine adopts a preset deep reinforcement learning algorithm to carry out the scheduling of the downlink radio resources.

Further, the deep reinforcement learning algorithm is a DDQN algorithm.

Further, the resource allocation and allocation result sending module is specifically configured for:

utilizing the preset deep reinforcement learning algorithm to carry out the scheduling of the radio resources by regarding the ever-changing demand on user service as a state of the environment and the allocated radio resources as the environment; and learning a value distribution of action by minimizing the difference between an estimated value distribution of action and a target value distribution of action, and learning a value distribution of action through an estimated value distribution of state and an action advantage function.

Further, the apparatus further includes: a scheduling result monitoring module, configured for:

monitoring the sequence number of scheduled frame, downlink bandwidth and maximum downlink information quantity in real time, and displaying a monitoring result.

In yet another aspect, the present invention also provides an electronic device, which includes a processor and a memory, wherein at least one instruction is stored in the memory, and the instruction is loaded and executed by the processor to implement the aforementioned method.

In yet another aspect, the present invention also provides a computer-readable storage medium in which at least one instruction is stored, and the instruction is loaded and executed by the processor to implement the aforementioned method.

The technical solutions according to the present invention at least bring the following beneficial effects:

by adopting the intelligent AI engine for allocation and a trained machine model to schedule and allocate the resources during the scheduling of downlink radio resources, the present invention can reduce delays and redundant information to a great extent; each time when resource scheduling is required, the resources only need to be directly allocated through the model, avoiding multiple information transmission and confirmation processes, so that the whole system can run more smoothly, and thereby the performance of the system is improved; when applied to the scheduling and allocation of downlink radio resources in an OAI system, the present invention can completely replace the original resource allocation mode, and can greatly reduce delays; adopting the DDQN algorithm in the area of deep reinforcement learning, the present invention designs a DDQN algorithm for a virtual wireless network, and utilizes the AI engine to carry out the intelligent scheduling of downlink radio resources; and moreover, through a correspondingly configured interface, allocated resources obtained by a plurality of user equipments (UEs) can be viewed.

BRIEF DESCRIPTION OF THE DRAWINGS

In order to more clearly illustrate the technical solutions in the embodiments of the present invention, the accompanying drawings which are required to be used in the description of the embodiments will be introduced briefly below. Apparently, the accompanying drawings described below are merely some embodiments of the present invention, and those of ordinary skill in the art can also obtain other accompanying drawings according to these accompanying drawings without making creative efforts.

DETAILED DESCRIPTION OF THE EMBODIMENTS

In order to make the objective, technical solutions and advantages of the present invention clearer, implementations of the present invention will be further described in detail below with reference to the accompanying drawings.

First Embodiment

Aimed at the problem on how to schedule and allocate downlink radio resources, the present embodiment provides an AI engine-supporting downlink radio resource scheduling method applied in an open-source OpenAirInterface (OAI) system. That is, configuration is implemented under an OAI engine, and a DDQN algorithm is designed for training to obtain a packaged AI model applicable to the engine, which can be configured with a plurality of UEs at most for resource allocation.

Figure 1:
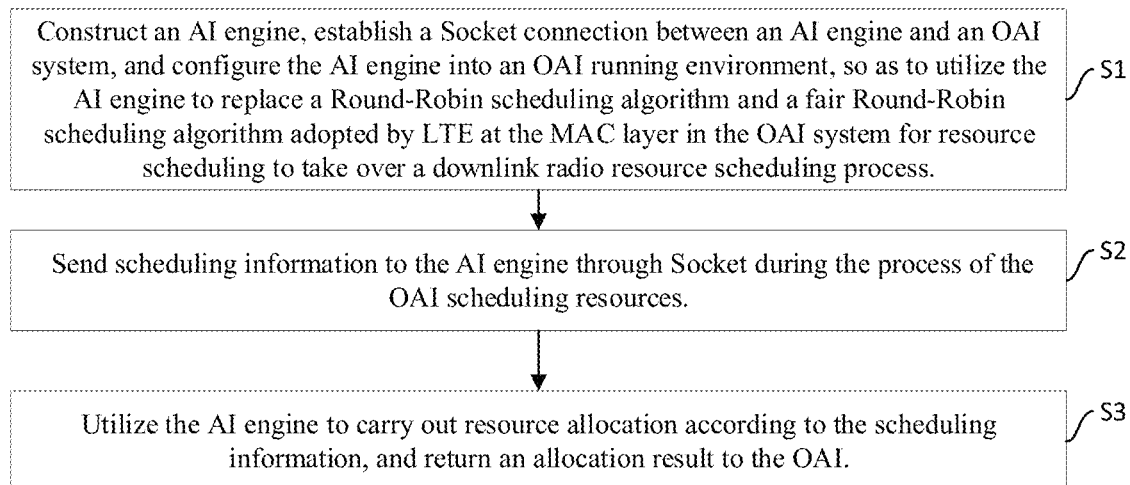
FIG. 1 is a schematic flowchart of executing an AI engine-supporting downlink radio resource scheduling method according to an embodiment of the present invention.

As shown in FIG. 1, the flow of executing the method includes the following steps:

(S1) constructing an AI engine, establishing a Socket connection between an AI engine and an OAI system, and configuring the AI engine into an OAI running environment, so as to utilize the AI engine to replace a Round-Robin scheduling algorithm and a fair Round-Robin scheduling algorithm adopted by LTE at the MAC layer in the OAI system for resource scheduling to take over a downlink radio resource scheduling process;

It should be noted that in order to implement the allocation of downlink resources by the AI engine, it is necessary to have a clear understanding of the running flow of OAI codes. The OAI system achieves a task message queue by means of middleware of subframes (ITTI), and then enables codes of the whole radio access network (RAN) side to run. In order to implement allocation in the original system by the AI engine, it is required to replace the original allocation mode in the system. At a physical layer (Media Access Control, MAC) of the OAI, a scheduler of the media access control MAC layer will schedule downlink shared channels (DL-SCHs) and uplink shared channels (UL-SCHs) at each subframe. There are two types of scheduling algorithms, one is a default Round-Robin scheduling algorithm, and the other is a fair Round-Robin scheduling algorithm (fair-RR). The OAI allocates downlink resources by means of these two algorithms. The present embodiment will use the AI engine to replace the two algorithms to take over a scheduling process.

(S2) sending scheduling information to the AI engine through Socket during the process of the OAI scheduling resources;

(S3) utilizing the AI engine to carry out resource allocation according to the scheduling information, and returning an allocation result to the OAI.

It should be noted that during the running process of the OAI, the scheduling information needed is stored in a context, and context information is sent to an AI scheduling algorithm through an AI engine interface for intelligent resource management and control. After resource allocation is completed by the AI algorithm, an allocation result is returned to an OAI-RAN operating environment through the AI engine interface.

During the process of scheduling by the OAI, the useful scheduling information is sent to a receiving end of Python through Socket. After receiving the related information, the related algorithm of the AI engine will generate a corresponding scheduling result and return it to the OAI, thus completing a scheduling process. During the process of running the OAI codes, a Socket connection (as already described above) similar to a hook function is added. Parameters in the process of real-time running are sent into an AI algorithm of a Python end through the Socket connection, and a new allocation result obtained by the AI algorithm is then returned to the OAI, so as to modify a native scheduling result of the OAI. Once the Socket connection is established, the OAI can be linked to the AI engine for a long time.

Based on the above, the process of implementing the downlink radio resource scheduling method of the present embodiment is as follows:

Step 1: capturing the AI engine interface, and finding out eNB_dlsch_ulsch_scheduler and other functions in key technical codes for location and modification.

Step 2: capturing data input and output of AI engine data, including module_idP, frameP and subframeP identifying functions, creating a context, saving an eNB and storing UE status information.

Step 3: establishing an interface C2PY capable of meeting the connection between the AI engine and a real-time OAI-RAN operating environment based on Socket, so that the AI engine and the real-time OAI-RAN operating environment can communicate with each other. By introducing a Socket communication protocol and adding an external interface for the OAI into AI engine-supporting radio resource scheduling in the present embodiment, data are sent out.

Step 4: respectively configuring the C2PY interface in the OAI running environment and the AI engine.

Step 5: finding out an openair2 /LAYER2/MAC/preprocessor.c file for the deployment of the C2PY interface, and carrying out the allocation of downlink resource blocks allocated by the resource-scheduling OAI. In the present embodiment, a downlink allocation flow in preprocessor in the OAI codes is modified, and the scheduling interface of the OAI is sent to the Python end through the written Python interface (C2PY).

Step 6: creating a long Socket connection with the Python end of the AI engine by utilizing a Socket library in C language, ensuring that the interface operates for the first time, and storing connection information into sockfd in a context RC.

Step 7: in order to ensure the establishment of the long Socket connection, carrying out the establishment of the long Socket connection in a function before running preprocessor.c.

Step 8: achieving the long Socket connection through a static variable, so that the C2PY interface has been deployed in the OAI.

Step 9: repeating Step 5 to Step 8, and utilizing the Python language of the AI engine to carry out corresponding deployment.

Step 10: compiling a C program newly added in the OAI into a dynamic library file .so for use in OAI compilation.

Step 11: C2PY successfully connecting the OAI with the Python end of the AI engine.

Step 12: creating a plurality of UEs capable of mutually inputting and outputting data by utilizing an OAI running platform, so that a basic communication network can be established.

Step 13: establishing DDQN-based rate-limited PRB allocation to achieve the purpose of utilizing the AI engine to allocate downlink resources. In the present embodiment, a DDQN algorithm is designed and utilized for a virtual wireless network, including a method of carrying out radio resource scheduling under an action state. Scheduled frame numbers, downlink bandwidth, maximum downlink information quantity and the like are monitored in real time at a terminal.

Step 14: carry out DDQN-based intelligent resource allocation, configuring an interface, and utilizing the UE for viewing; acquiring the ability to access a local area network after accessing the eNB; and viewing a result of intelligent resource allocation by utilizing the form of a GRB grid.

After the connection between the AI engine and the OAI interface is achieved, the problem of resource management and control in the algorithm construction inside the AI engine in the focus of the present embodiment is described as follows: how can 25 PRBs be allocated in each subframe (TTI) to the n UEs in LTE-5 MHz-25 PRB downlink resource transmission scheduling while the n UEs must all meet their rate requirements? Specific parameters (including a current rate and parameters data) are transmitted to the AI engine through the OAI engine, data of each subframe is transmitted back into the OAI after being allocated by the AI engine, and thus the Round-Robin scheduling algorithm and the fair-RR scheduling algorithm are replaced by the AI engine.

For the AI engine, the present embodiment adopts the DDQN algorithm for design. Specifications: An action space is Action_Space; a reward function is Reward (A); a state space is S; a current network input is Q; the number of iterations is N; state characteristic dimensionality is n; and a target network is Q'. Output: A network parameter is Q, and the algorithm is as follows:

DDQN Algorithm-Based Intelligent Downlink Resource Allocation:

1. Problem modeling: How can 25 PRBs be allocated in each subframe (TTI) to a plurality of UEs in LTE-5 MHz-25 PRB downlink resource transmission scheduling?

2. Used algorithm: DDQN

3. Goal of algorithm: making the n UEs meet their rate requirements:

From 1 to n:
$UE_1\_RATE=r_1$
$UE_2\_RATE=r_2$
$UE_3\_RATE=r_3$
...
$UE_n\_RATE=r_n$ 5. Action space:

$$Action\_Space = \begin{bmatrix} 1 & 0 & 0 & ... & 0 \\ 0 & 1 & 0 & ... & 0 \\ 0 & 0 & 1 & ... & 0 \\ \vdots & \vdots & \vdots & \ddots & \vdots \\ 0 & 0 & 0 & ... & 1 \end{bmatrix}$$

It represents respectively adding i resource blocks to the UE 1 to UE N

6. State space: $S=[R_1, R_2, R_3, ..., R_n]$, S.T. $\Sigma R \leq 100$

7. Reward function: The reward function Reward is related to a rate reached by each UE:
Reward=0
if((Rates[action]>=RATES[action])):
    reward=-1
else if((rates[action]<RATES[action])):
    reward=1

8. Goal of optimization:

$$Q' = \min \sum_{i=1}^{n} |rates\,[action] - RATES[action]|$$

Figure 2:
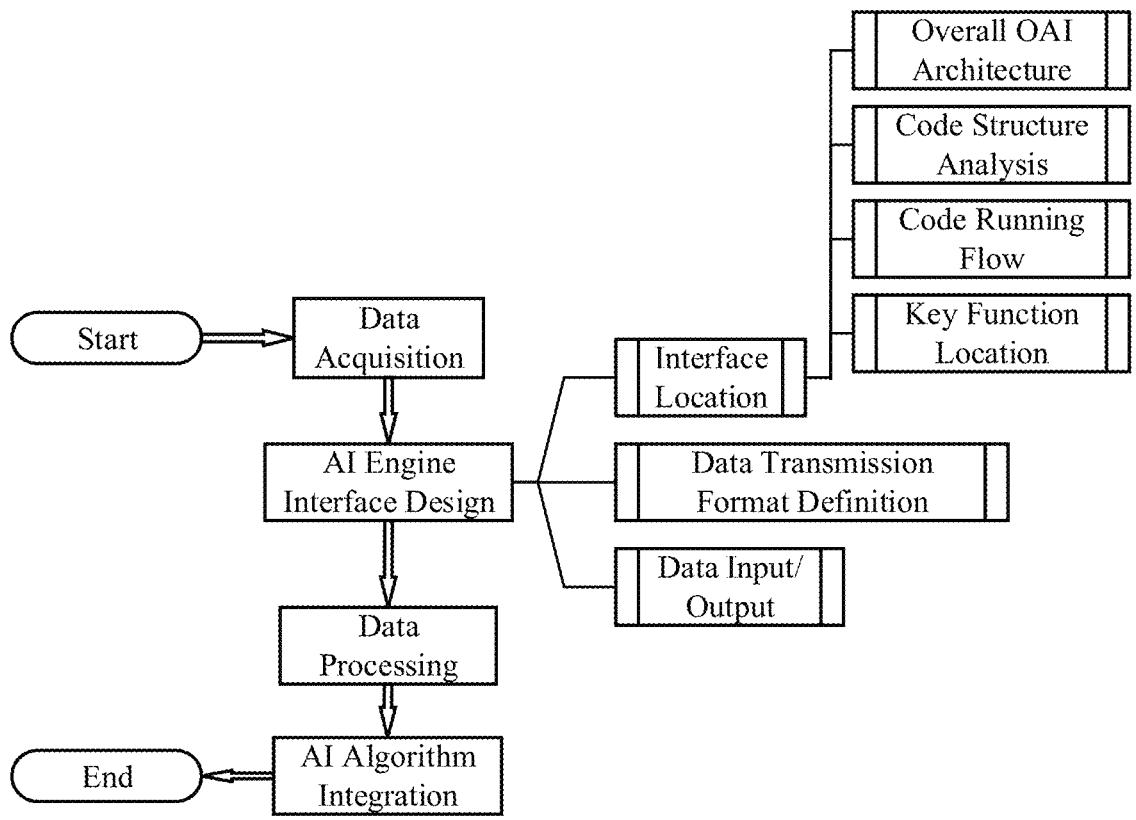
FIG. 2 is a schematic flowchart of an AI engine interface design according to an embodiment of the present invention.

Even if the absolute sum of differences between all the UEs and their required rates is smallest The principle of implementing the downlink radio resource scheduling method of the present embodiment will be illustrated in more detail below with reference to the accompanying drawings. In order to implement the AI engine-supporting downlink radio resource scheduling method, a specific implementation is as follows:

an interface for implementing the AI engine and an OAI platform is configured, a variety of deep reinforcement learning algorithms are embedded, and intelligent resource allocation is carried out. Fine-grained traffic measurement is carried out in the eNodeB, basic characteristic data of traffic are statistically analyzed, the type of traffic is identified according to statistic characteristic data, and accurate input information is provided for intelligent service resource allocation. The flow of an AI engine interface design is shown as FIG. 2, including AI engine interface location, data transmission format definition and input/output at data ends of UEs.

In order to construct an OAI-based AI engine interface, the OAI achieves a task message queue through middleware of ITTI, thus enabling the whole RAN side (i.e. the eNodeB and the UE) to operate successfully. During the real-time operating process of the RAN environment of the OAI, in each subframe, the OAI program will call a scheduling function eNB_dlsch_ulsch_scheduler in eNB_scheduler.c. The scheduler of the MAC layer of the OAI will schedule the DLSCHs and the ULSCHs at each subframe. Therefore, an AI interface location function (eNB_dlsch_ulsch_scheduler) is sought in openair2/LAYER2/MAC.

Figure 3:
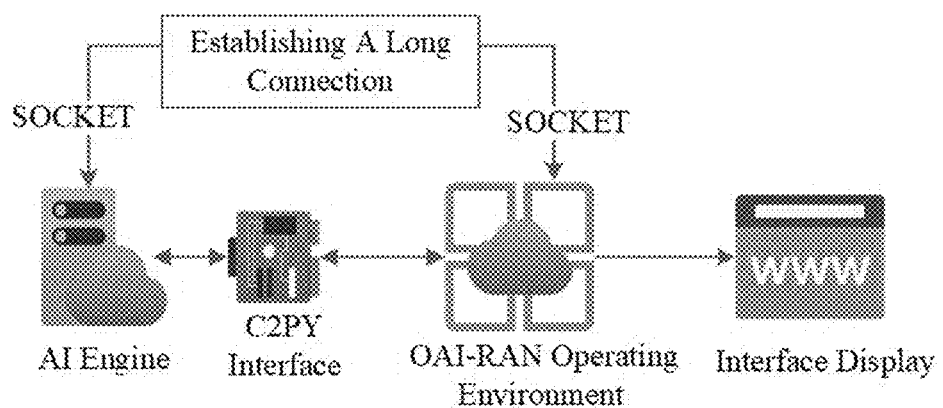
FIG. 3 is a schematic diagram of communication connection between OAI and an AI engine according to an embodiment of the present invention.

During the process of scheduling run by the RAN of the OAI in real time, the C2PY interface is utilized to configure the AI engine into the OAI running environment. As shown in FIG. 3, during the process of scheduling by the OAI, the useful scheduling information is sent to a receiving end (AI engine) of Python through Socket. After receiving the related information, the related algorithm of the AI engine will generate a corresponding scheduling result and return it to the OAI, thus completing a scheduling process. During the process of running the OAI codes, a Socket connection (as already described above) is added. Parameters in the process of real-time running are sent into an AI algorithm of the Python end through the Socket connection, and a new allocation result obtained by the AI algorithm is then returned to the OAI, so as to modify a native scheduling result of the OAI. Once the Socket connection is established, the OAI can be linked to the AI engine for a long time. The C2PY interface is deployed into openair2/LAYER2/MAC/preprocessor.c. SOCKET is deployed into the entry eNB_scheduler.c of the top layer of a scheduling flow of the MAC layer. Corresponding library dependencies are added into a CMakeList file compiled by the OAI, and C2PY is compiled and run, so that three dynamic libraries of C2PY are connected into the dependencies of the OAI. The Python end of C2PY is turned on, the eNB is started, and the OAI is connected to the Python end of the AI engine.

In AI algorithm integration, by regarding the ever-changing demand on service as a state of the environment and the allocated resources as the environment, deep reinforcement learning (DRL) is utilized to solve this problem. In order to reduce the influence of annoying randomness and noise embedded in received service level agreement (SLA) service satisfaction rate (SSR) and spectrum efficiency (SE), it is mainly proposed that based on a double deep Q-network (DDQN), a value distribution of action is learned by minimizing the difference between an estimated value distribution of action and a target value distribution of action and a value distribution of action is learned through an estimated state value distribution and an action advantage function. Finally, through the algorithm, intelligent resource allocation is performed for the plurality of UEs in the OAI running environment, the outbound traffic of each UE is statistically analyzed, and a data access interface is provided for an intelligent service resource allocation module.

Figure 4:
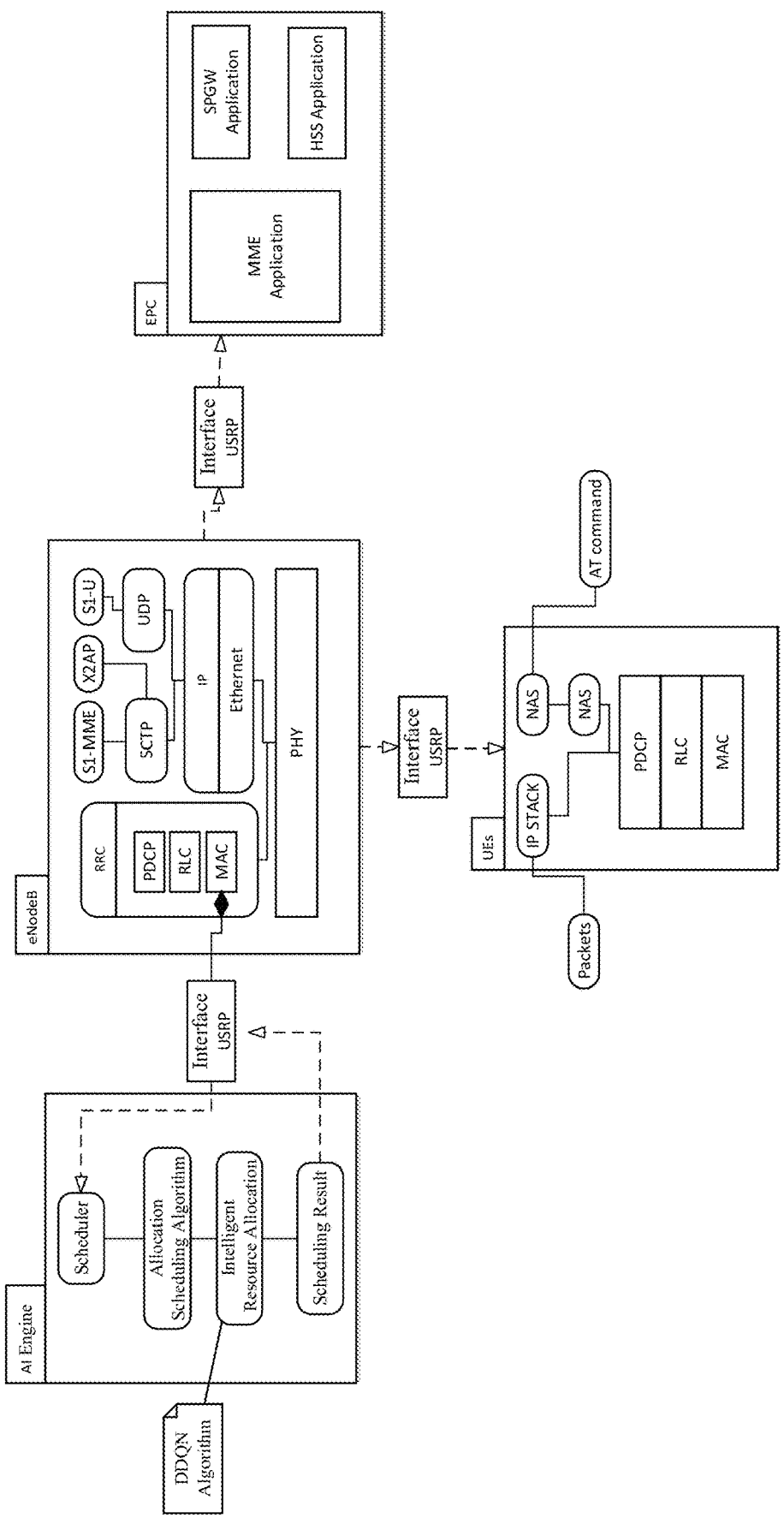
FIG. 4 is a block diagram of an overall architecture for the AI engine and an OAI running environment according to an embodiment of the present invention.

A block diagram of an overall architecture for the AI engine and the OAI running environment is shown as FIG. 4. The AI engine is first utilized to enable a communication network and start a core network EPC, and after accessing the eNB of the OAI running environment, the ability to access a local area network is acquired through the C2PY interface. A terminal page is created, front-end 25 PRB downlink resource allocation and DDQN allocation results are compared, and the comparison between an allocation result of the intelligent resource block allocation algorithm and a native allocation result of the OAI is checked. In a native downlink resource scheduling flow of the OAI, an allocated scheduling result and some other necessary information (acquired in the context) are sent to the AI engine through the AI engine interface, and after resource allocation is completed by the AI algorithm, an allocation result is returned to the OAI-RAN operating environment through the AI engine interface. A data transmission channel is established between the eNodeB and the AI engine, and the real-time calling of a variety of intelligent management and control algorithms in the AI engine is supported. The whole AI engine interface is developed based on an open-source OAI project, and by modifying source codes of the OAI, an interface function required by an AI native dynamic resource management and control system. Intelligent resource management and control oriented to requirements for multiple types of functions (e.g., uplink and downlink resource scheduling and power allocation) is achieved.

To sum up, the method of the present embodiment adopts the AI intelligent engine to replace the Round-Robin scheduling algorithm and the fair-RR scheduling algorithm adopted in LTE scheduling at the MAC layer in OAI system, thus reducing information redundancy and delays. In the present embodiment, during the design of the AI engine, context information and parameter information in the OAI are transmitted into the AI engine, resources are allocated by the AI engine and then transmitted back to the OAI, and thus, resource allocation is completed. The AI engine designed by the present embodiment adopts the DDQN algorithm, with the corresponding state space and action space and the like being designed for the OAI system, and can simultaneously support the scheduling and allocation of resources to N users (UEs). Through the model in AI engine, downlink radio resources are scheduled and allocated rapidly, thus reducing the redundancy of OAI information transmission and increasing the operating efficiency of the OAI system.

Second Embodiment

The present embodiment provides an AI engine-supporting downlink radio resource scheduling apparatus, which includes:

an AI engine construction module, configured for constructing an AI engine, establishing a Socket connection between the AI engine and an OAI system and configuring the AI engine into an OAI running environment, so as to utilize the AI engine to replace the Round-Robin scheduling algorithm and the fair Round-Robin scheduling algorithm adopted by LTE at an MAC layer in the OAI system for resource scheduling to take over a downlink radio resource scheduling process;

a scheduling information sending module, configured for sending scheduling information to the AI engine through Socket during the resource scheduling process of an OAI system; and a resource allocation and allocation result sending module, configured for utilizing the AI engine to carry out resource allocation according to the scheduling information and returning a resource allocation result to the OAI.

The AI engine-supporting downlink radio resource scheduling apparatus of the present embodiment corresponds to the AI engine-supporting downlink radio resource scheduling method of the aforementioned first embodiment, wherein the function implemented by each functional module in the AI engine-supporting downlink radio resource scheduling apparatus of the present embodiment is in one-to-one correspondence to each flow step in the AI engine-supporting downlink radio resource scheduling method of the aforementioned first embodiment.

Third Embodiment

The present embodiment provides an electronic device, which includes a processor and a memory, wherein at least one instruction is stored in the memory, and the instruction is loaded and executed by the processor to implement the method of the aforementioned first embodiment.

The electronic device may be greatly varied due to different configurations or performances, and may include one or more central processing units (CPU) and one or more memories, wherein at least one instruction is stored in the memory, and the instruction is loaded by the processor and executes the aforementioned method.

Fourth Embodiment

The present embodiment provides a computer-readable storage medium in which at least one instruction is stored, and the instruction is loaded and executed by a processor to implement the method of the aforementioned first embodiment. The computer-readable storage medium may be a ROM, a random access memory, a CD-ROM, a magnetic tape, a floppy disk or an optical data storage device. The instruction stored in the computer-readable storage medium may be loaded by a processor in a terminal and execute the aforementioned method.

In addition, it should be noted that the present invention may be provided as a method, an apparatus or a computer program product. Thus, the embodiments of the present invention may adopt the form of a complete hardware embodiment, a complete software embodiment or an embodiment combined with aspects of software and hardware. Furthermore, the embodiments of the present invention may adopt the form of a computer program product which is implemented on one or more computer-usable storage media containing computer-usable program codes.

The embodiments of the present invention are described with reference to the method and terminal device (system) of the embodiments of the present invention and the flow chart and/or block diagram of the computer program product. It should be understood that each flow and/or block in the flow chart and/or the block diagram and/or the combination of the flows and/or blocks in the flow chart and/or the block diagram can be implemented by the computer program instructions. The computer program instructions may be applied to the processor of a general-purpose computer, an embedded processor or other programmable data processing terminal equipment to bring forth a machine, so that the instructions executed by the processor of the computer or the programmable data processing terminal device can bring forth a device for implementing functions specified by one or more flows in the flow chart and/or one or more blocks in the block diagram.

The computer program instructions may also be stored in a computer-readable memory capable of guiding the computer or the programmable data processing terminal equipment to operate in a specific mode, so that the instructions stored in the computer-readable memory can bring forth a manufacture including an instruction apparatus, and the instruction apparatus implements the functions specified by one or more flows in the flow chart and/or one or more blocks in the block diagram. The computer program instructions also can be loaded into the computer or the programmable data processing terminal equipment, so that a series of operation steps are executed on the computer or the programmable data processing terminal equipment to generate processing implemented by the computer, and thereby the instructions executed on the computer or the programmable data processing terminal equipment provide steps for implementing the functions specified by one or more flows in the flow chart and/or one or more blocks in the block diagram.

It should also be noted that the term "comprise", "include" or any other variant thereof herein is intended to cover non-exclusive inclusion, so that a process, method, article or terminal equipment including a series of elements includes not only those elements but also other elements not explicitly listed or elements inherent to such process, method, article or terminal equipment. Without more restrictions, the elements defined by the sentence "include a . . . " do not exclude the existence of other identical elements in the process, method, article or terminal equipment including the elements.

Finally, it should be noted that the above is the preferred embodiments of the present invention. It should be pointed out that although the preferred embodiments of the present invention have been described, once those skilled in the art know the basic creative concept of the present invention, they can make some improvements and embellishments without departing from the principle described in the present invention, and these improvements and embellishments shall also be regarded as being within the protection scope of the present invention. Therefore, the appended claims are intended to be interpreted as including the preferred embodiments and all changes and modifications falling within the scope of embodiments of the present invention.

What is claimed is:

1. An Artificial Intelligence (AI) engine-supporting downlink radio resource scheduling method, comprising:
constructing an AI engine, establishing a Socket connection between the AI engine and an Open Air Interface (OAI) system, and configuring the AI engine into an OAI running environment to utilize the AI engine to replace a Round-Robin scheduling algorithm and a fair Round-Robin scheduling algorithm for resource scheduling to take over a downlink radio resource scheduling process, wherein the Round-Robin scheduling algorithm and the fair Round-Robin scheduling algorithm are adopted by a Media Access Control (MAC) layer in the OAI system;
sending scheduling information to the AI engine through a Socket during the downlink radio resource scheduling process of the OAI system; and
utilizing the AI engine to carry out a resource allocation according to the scheduling information, and returning a resource allocation result to the OAI system.

2. The AI engine-supporting downlink radio resource scheduling method of claim 1, wherein the AI engine adopts a preset deep reinforcement learning algorithm to carry out the resource scheduling of downlink radio resources.

3. The AI engine-supporting downlink radio resource scheduling method of claim 2, wherein the preset deep reinforcement learning algorithm is a double deep Q-network (DDQN) algorithm.

4. The AI engine-supporting downlink radio resource scheduling method of claim 2, wherein the step of utilizing the AI engine to carry out the resource allocation according to the scheduling information comprises:

utilizing the preset deep reinforcement learning algorithm to carry out the resource scheduling of the downlink radio resources by regarding an ever-changing demand on a user service as a state of an environment and regarding allocated radio resources as the environment; and learning a value distribution of an action by minimizing a difference between an estimated value distribution of the action and a target value distribution of the action, and learning the value distribution of the action through an estimated value distribution of the state and an action advantage function.

5. The AI engine-supporting downlink radio resource scheduling method of claim 1, wherein after the step of utilizing the AI engine to carry out the resource allocation according to the scheduling information, the AI engine-supporting downlink radio resource scheduling method further comprises:

monitoring scheduled frame numbers, downlink bandwidth and maximum downlink information quantity in real time, and displaying a monitoring result.

6. A non-transitory computer readable storage medium storing a computer program, wherein the computer program, when executed by a processor, causes the processor to perform a method comprising:

constructing an AI engine, establishing a Socket connection between the AI engine and an Open Air Interface (OAI) system, and configuring the AI engine into an OAI running environment to utilize the AI engine to replace a Round-Robin scheduling algorithm and a fair Round-Robin scheduling algorithm for resource scheduling to take over a downlink radio resource scheduling process, wherein the Round-Robin scheduling algorithm and the fair Round-Robin scheduling algorithm are adopted by a Media Access Control (MAC) layer in the OAI system;

sending scheduling information to the AI engine through a Socket during the downlink radio resource scheduling process of the OAI system; and utilizing the AI engine to carry out a resource allocation according to the scheduling information, and returning a resource allocation result to the OAI system.

7. The non-transitory computer readable storage medium of claim 6, wherein the AI engine adopts a preset deep reinforcement learning algorithm to carry out the resource scheduling of downlink radio resources.

8. The non-transitory computer readable storage medium of claim 7, wherein the preset deep reinforcement learning algorithm is a double deep Q-network (DDQN) algorithm.

9. The non-transitory computer readable storage medium of claim 7, wherein the method further comprises :

utilizing the preset deep reinforcement learning algorithm to carry out the resource scheduling of the downlink radio resources by regarding an ever-changing demand on a user service as a state of an environment and regarding allocated radio resources as the environment; and learning a value distribution of an action by minimizing a difference between an estimated value distribution of the action and a target value distribution of the action, and learning the value distribution of the action through an estimated value distribution of the state and an action advantage function.

10. The non-transitory computer readable storage medium of claim 6, wherein the method further comprises:

monitoring a sequence number of a scheduled frame, downlink bandwidth and maximum downlink information quantity in real time, and displaying a monitoring result.

* * * * *